June 28, 1960 D. W. MORGAN 2,942,460
LINEAR MEASUREMENT DEVICE WITH THERMAL COMPENSATION
Filed March 21, 1957 3 Sheets-Sheet 1

INVENTOR.
DONALD W. MORGAN
BY
*Christie, Parker & Hale*
ATTORNEYS

June 28, 1960  D. W. MORGAN  2,942,460
LINEAR MEASUREMENT DEVICE WITH THERMAL COMPENSATION
Filed March 21, 1957  3 Sheets-Sheet 2

INVENTOR.
DONALD W. MORGAN
BY
Christie, Parker & Hale
ATTORNEYS

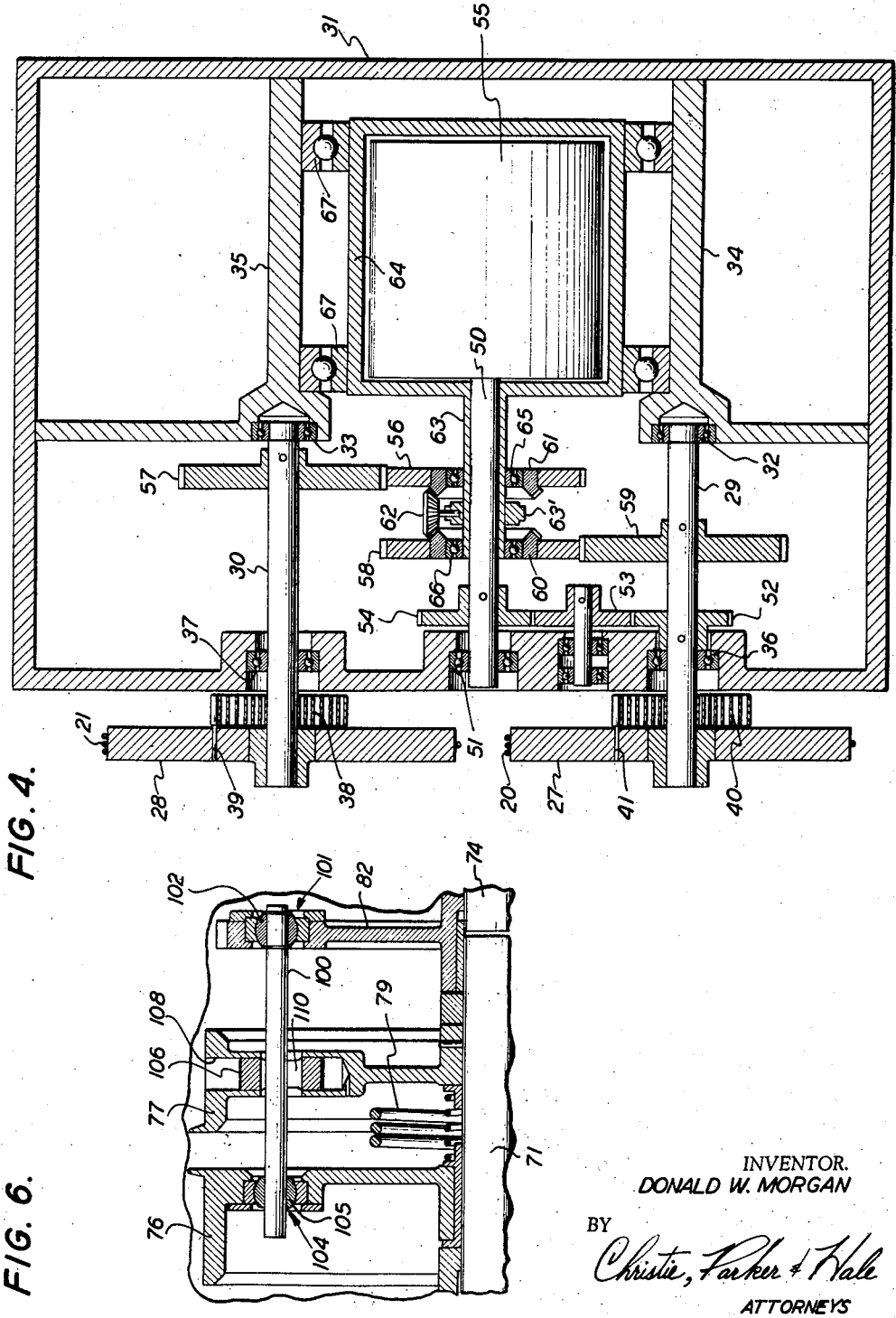

United States Patent Office 2,942,460
Patented June 28, 1960

2,942,460

LINEAR MEASUREMENT DEVICE WITH THERMAL COMPENSATION

Donald W. Morgan, La Canada, Calif., assignor to Sanberg-Serrell Corporation

Filed Mar. 21, 1957, Ser. No. 647,622

12 Claims. (Cl. 73—147)

My invention relates to linear measurements, and more particularly to a linear measurement device adapted for use in areas subject to a wide variety of temperatures, and includes means for compensating for changes in dimension of the measuring means due to temperature changes.

All measuring devices, when utilized under circumstances where temperatures are highly variable, change dimension due to expansion or contraction in response to varying temperatures. These expansions and contractions of the measuring device generally introduce an error in the measurement. Where measurement devices are used in areas of varying temperatures, some means for compensating for the contraction and expansion of the measuring means due to changes in temperature is highly desirable.

An illustration of a particular operation in which a temperature compensating system is necessary is in the operation of certain types of wind tunnels used for testing of high speed aircraft. For studies involving high speeds, such as supersonic speeds, the temperature of the wind tunnel system reaches very high temperatures with a wide variation in the temperatures in adjacent sections of the wind tunnel system. Supersonic wind tunnels have a throat or orifice which is shaped to increase the velocity of air moving through the throat. The resulting velocity may be varied by adjusting the shape and position of a wall or walls forming the throat region. To obtain accurate data, the walls must be precisely located and the throat portion area must be held constant to provide constant velocity during a data run. A servo system may be utilized in an attempt to maintain the throat area constant. However, a servo system applies a correction in response to a signal sent from a position sensor; but any position sensor actuated by a measurement means includes in its signal an error due to the change in dimension of the measuring device caused by a wide variety of temperatures to which the measuring device is subjected.

Another example in which my new device, including a temperature compensating means, finds particular use is in data transmission wherein it is desired to obtain a remote indication of the length of a particular element subject to temperature changes, or the separation of a pair of elements, which separation may vary in response to temperature changes. A system which transmits a signal which is representative of the length of the element to be measured or the separation of two elements, which signal does not include therein the error due to the changes in length of dimensions of the measuring means, is highly desirable.

My invention overcomes the aforementioned disadvantages by including in the position sensor a pair of members which are connected to at least one of the elements which are to be measured or maintained in a fixed relationship. Each of the members is made of a different material, thus providing for different thermal coefficients of expansion for each material. Differential means are provided for correcting the position sensor for the changes in length of the pair of members due to temperature changes. The differential correcting means is arranged so that the difference in the change in length of one of the aforementioned pair of members, when compared to the change in length of the other aforementioned member, is utilized to apply a correction for the change in length of one of the pair of members.

A better understanding of the present invention and its advantages may be had upon a reading of the following detailed description when taken in connection with the drawings, in which:

Fig. 4 is a view taken along lines 3—3 of Fig. 3 and showing a differential gear temperature compensating means;

Fig. 6 is a fragmentary sectional view of an alternative construction of the device of Fig. 5.

Figure 1:
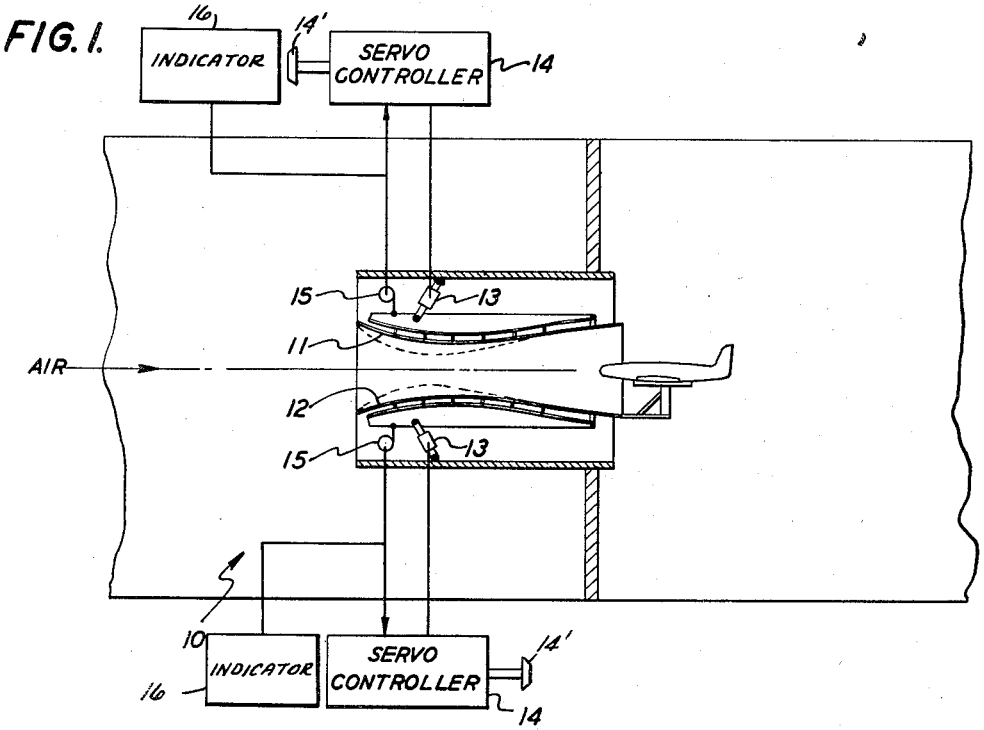
Fig. 1 is a block and schematic diagram showing an example of one type of system in which my invention has particular utility.

Referring more particularly to Fig. 1, a system including a servo arrangement is shown for maintaining a fixed distance between two opposite walls of an orifice in a wind tunnel. The servo sensing element necessary is included in the wind tunnel structural area. The wind tunnel structural area 10 may be subjected to very high temperatures, with the temperature gradients within the area varying greatly. The adjustable walls of the orifice to be maintained in a fixed relationship are indicated at 11 and 12.

The usual components of a servo system are shown in block form. The servo system includes an actuator 13, shown as hydraulic rams, which is utilized to change the position of the associated wall, such as 11 or 12, in response to a signal received from a controller 14. A position sensor is generally used to sense a change in position of the walls with the change in position being detected by a position sensing device 15 which transmits a signal to the controller 14. The controller 14 output is proportional to the difference between the signal from the sensing device and a reference signal indicative of the desired wall position. A control knob 14' is used to set the reference in the controller to a predetermined value.

Since the position sensing device 15 provides a signal indicative of the relative position of the associated wall of the wind tunnel, a suitable indicator 16 may be connected to the output of the sensing device 15 to provide a direct indication of the wall position. The indicator 16 may be mechanical or electrical depending on the form of the sensing device 15. As hereinafter described, the sensing device 15 may provide an output in the form of a shaft rotation or, by means of a potentiometer or the like, in the form of an electrical signal. In the former case, the indicator 16 may be a simple dial, and in the latter case the indicator 16 may be a voltmeter.

My invention is particularly directed to the design and construction of the position sensing device 15. Any variation from the desired fixed spacing between the walls 11 and 12 is sensed by the sensing device 15, an error signal being transmitted to the controllers 14 to reposition the actuators 13. The actuators 13 apply a correction to the walls 11 and 12.

Figure 3:
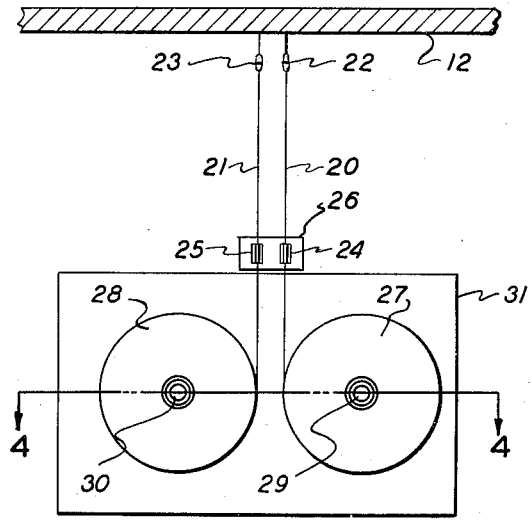
Fig. 3 is an elevational view showing my invention in use.

The controllers 14 and actuators 13 can be either mechanical, electrical or hydraulic, depending upon the circumstances. My new sensing device, including means for compensating for temperature variations in the measuring members, may be utilized in conjunction with any one of the types of system used. Also, it is to be understood that my new temperature compensating system may be utilized for purposes other than in conjunction with wind tunnels, Fig. 1 being included for the purposes of illustrating only one purpose for which the new temperature compensating measuring system finds particular utility. Fig. 3 shows a front elevational view of the sensing device 15, showing a pair of flexible members 20 and 21 such as wires or flat bands which are attached to the element to be sensed, as the lower wall 12 of the wind tunnel throat shown in Fig. 1. Member 20 consists of a material having a different thermal coefficient of expansion from the material utilized in member 21. Members 20 and 21 may be connected to the element 12 by any suitable means such as clevis and swivel connections 22 and 23. Rollers 24 and 25 located on a roller plate 26 are provided for guiding the wires, with the wires 20 and 21 being positioned in grooves in the rollers 24 and 25, respectively.

The wires 20 and 21 are wound about a pair of drums 27 and 28. Suitable spring biasing means (not shown) is provided in each of the drums 27 and 28 for maintaining a tension upon wires 20 and 21, respectively. The drum 27 is rotatable about a shaft 29 and the drum 28 is rotatable about a shaft 30. Shafts 29 and 30 protrude from a housing 31, with the housing 31 containing the means for compensating for changes in length of the wires 20 and 21 due to temperature influences.

Figure 2:
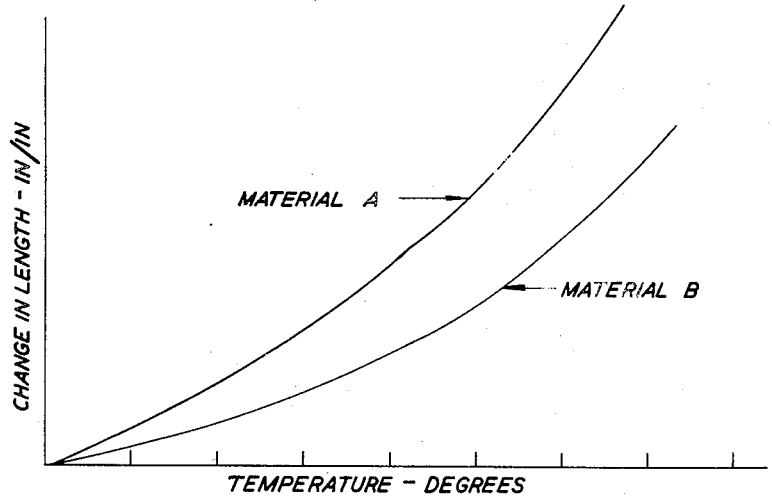
Fig. 2 is a graphical plot of the change in coefficient of expansion of the two wires with temperature.

If the coefficient of expansion of each of the wires 20 and 21 is constant over a wide temperature range or vary in a fixed ratio, as shown in Fig. 2, the temperature conditions may vary from one portion of the wire to the next portion of the wire, and my new compensating means will effectively apply the necessary correction. For example, in wind tunnels the temperature of the wire adjacent the clevis and swivel connections 22 and 23 may be 600° F., with the temperature adjacent the drums 27 and 28 being 200° F., with the wire portions between the clevis and swivel connections and the drums being subjected to temperatures anywhere between 600° F. and 200° F. However, despite the temperature variation to which wires 20 and 21 are subjected, if the ratio of thermal coefficients of expansion of the two wires is constant over the expected temperature range, my new invention can be effectively utilized. Examples of appropriate material for wires 20 and 21 are Invar "49," which has a thermal coefficient of the order of expansion of $5.4 \times 10^{-6}$ in./in. per degree F. for the temperature range of 70° to 800° and stainless steel 25–12 having a coefficient of thermal expansion of the order of $9.9 \times 10^{-6}$ in./in. per degree F. for the same temperature range.

One manner in which the thermal coefficients of expansion of the wires 20 and 21 may be utilized to apply a correction for temperature variations is shown in Fig. 4. The shafts 29 and 30 are journaled in housing 31 by means of bearings 32 and 33, respectively, located in shaft support members 34 and 35, respectively. Each of the shafts 29 and 30 extend outwardly of the housing 31. Shafts 29 and 30 are rotatable as provided by additional bearings 36 and 37 in conjunction with bearings 32 and 33.

A clock-type spring 38 is mounted upon shaft 30 and coaxially therewith. The clock type spring 38 is connected to the drum 28 by means of a pin 39. Hence the drum 28 is spring-loaded by the spring 38 so that a tension is maintained upon the wire 21 wound about the drum. A similar clock type spring 40 and pin 41 are utilized to spring-load the drum 27. Hence, any movement of the element 12 (Fig. 1), in addition to any changes in length of wires 20 and 21 due to thermal conditions, will result in a rotation of each of the drums 27 and 28 an amount proportional to the sum of the change in position of the wall 12 and the change in length of the particular wire connected to the drum. The drums may be made of Vycor glass having substantially zero coefficient of expansion.

The clock-type springs 38 and 40 are arranged so that one of the drums rotates clockwise and the other drum rotates counterclockwise. Rotation of the shaft 29 along with the drum 27 effects a rotation of a third shaft 50 in the same direction as the direction of rotation of the shaft 29. Rotation of the shaft 50 is permitted by the provision of shaft bearing 51 and is effected by the gear train 52, 53, and 54, with the gear 52 being connected to the shaft 29 and the gear 54 being connected to the shaft 50. Rotation of the shaft 50 effects a similar rotation of a rotor means 55 connected to one extremity of the shaft 50.

An examination of the interconnection between the drum 27 and the rotor means 55 shows clearly that the rotation of the rotor means 55 is proportional to the rotation of the drum 27. Since the rotation of the drum 27 is proportioned to the sum of the movement of wall 12 and change in length of the wire 20, the rotation of the rotor member 55 is also proportional to the sum of the movement of the throat wall 12 and the wire member 20. The rotor means 55, which is shown schematically for purposes of illustration only, may constitute a portion of a potentiometer, which produces as an output a voltage proportional to the change in position of the rotor member 55. The voltage output of the potentiometer may be fed to the controller which operates the actuator to correct for the change in position of the wall 12. However, it is clear that the correction will be inaccurate because the movement of the rotor member 55 includes the change in length of the wire member 20 and, therefore, the movement of the rotor member is too great for the application of the proper correction which should reflect only the movement of the wall 12.

To compensate for the error due to changes in length of the wire member 20, a differential means is provided. The differential means may include a wheel gear 56 which is rotated by a gear 57 connected to the shaft 30. A second wheel gear 58 is rotated by a gear 59 which is connected to the shaft 29. Bevel gears 60 and 61 are provided on wheel gears 56 and 58, respectively. Bevel gears 60 and 61 mesh with a bevel pinion 62. A sleeve 63 is connected by means of a bevel pinion mount 63' to the bevel pinion 62. The sleeve is coaxial with shaft 50 and is connected at one of its extremities to a stator member 64. The rotation of wheel gears 56 and 58 about the sleeve 63 is provided by means of shaft bearings 65 and 66, respectively. If the drums 27 and 28 are equal in diameter, as is preferable, the gears 56 and 57 should have the same diametral ratio as the gears 58 and 59.

Rotation of the drum 27 in the counterclockwise direction causes rotation of the wheel 58 and the bevel gear 61 in the clockwise direction. Rotation of the drum 28 in the clockwise direction causes rotation of the wheel gear 56 in the counterclockwise direction. Of course, rotation of the drums 27 and 28 in the opposite directions will effect opposite directional rotations of the wheel gears 56 and 58; however, the wheel gear 56 always rotates in a direction opposite from the direction of rotation of the wheel gear 58.

Since the coefficient of thermal expansion of the wire 21 is different from that of the wire 20, rotation of the drum 28 as a result of changes in length of the wire 21 will be different from rotation of the drum 27 in response to changes in length of the wire 20. The resulting rotation of the wheel gear 56 therefore is different from rotation of the wheel gear 58. The bevel pinion 62 is thus rotated about the axis of shaft 50 an amount proportional to the difference in rotation between the wheel gears 56 and 58. Rotation of the bevel pinion 62 effects rotation of the stator means 64 due to the interconnection of the stator means 64 with the bevel pinion 62 through the sleeve 63. Rotation of the stator means 64 is permitted by the ball bearings 67.

To illustrate the operation of the differential arrangement shown in Fig. 4, assume that the wire 20 is made of stainless steel 25-12 and that the wire 21 consists of Invar "49." If the element to be measured, such as the wall 12 of Fig. 1, and the wires 20 and 21 are expanded or contracted due to temperature variations, the drum 27 will be rotated by the spring 40 an amount proportional to the change in dimensions of the wall 12 plus the change in length of the wire 20 for each degree change in temperature. The drum 28 will rotate an amount proportional to the change in dimensions of the wall 12 plus the change in the wire 21 for each degree change in temperature. The rotor member 55 is rotated an amount proportional to the rotation of drum 27 which, if uncompensated, would result in a voltage from the potentiometer which is in error. The error is proportional to the change in length of the wire 20. However, with the provision of the differential compensating means, including wheel gears 56 and 58, the stator member 64 is rotated in a direction to correct for the error in the signal generated from the potentiometer. Thus, the stator 64 is shifted the angular equivalent of the change in length of the wire 20 by the differential motion of drum 27 and the drum 28. The error signal generated from the potentiometer, for example, is thus proportional only to the change in dimensions of the wall 12.

It will be appreciated that to effect complete compensation of the sensing device of Fig. 4, the diametral ratios between the gears 52 and 54, or the ratio between the gears 56 and 57 and also the gears 58 and 59, should be designed according to the ratio of the thermal coefficients of expansion of the two wires 20 and 21. For example, if the ratio of the thermal coefficients of expansion of the two wires is 2:1 and the ratio of the gears 56 and 57 and the gears 58 and 59 is 1:1, then it will be observed that the ratio between the gears 52 and 54 must be 2:1 or 1:2 depending upon which wire has the largest coefficient of expansion. This can be appreciated by assuming that with a rise in temperature, the wire 20 expands twice as much as the wire 21. The differential gearing rotates the stator 64 in proportion to the difference in movement of the two wires. In order that the rotor 55 is rotated the same amount as the stator 64, to effect complete compensation for movement due to temperature change, the shaft 51 must be rotated only half as much as the shaft 29, assuming the gears 56 and 57 and the gears 58 and 59 are in the 1:1 ratio.

This error signal can be conducted to the remote indicator 16 such as a voltmeter, or, if the position of the wall element 12 is to be corrected automatically, the error signal can be conducted to the controller 14 which controls the actuator 13, which actuator adjusts the position of the wall accordingly to reduce the error signal to zero.

The stator 64 and rotor 55 are indicated schematically but with the electrical connections excluded. The stator-rotor arrangement is shown schematically to indicate that any type of data transmission and sensing means having a rotor arrangement in conjunction with a stator arrangement can be used effectively. For example, a potentiometer might be used, or if desired, a synchro transmitter or a resolver can be utilized.

Figure 5:
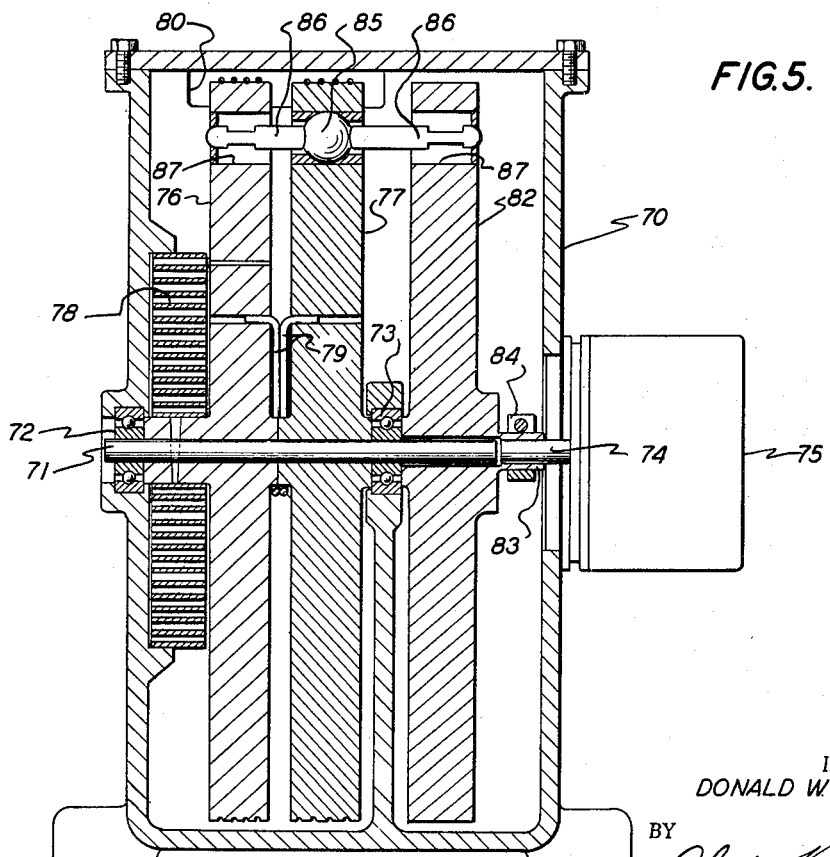
Fig. 5 is a side elevational view, partly in section, showing a temperature compensating system for use for correction of thermal expansion where the expansion is small due to a small temperature range, or the length of the measuring elements is small.

Fig. 5 shows in partial section an alternative embodiment of a differential compensating means which may be utilized when the thermal expansion is small due to small changes of temperature or the length of the wires is short. A housing 70 includes therein a shaft 71 which is journaled in bearings 72 and 73. A stub shaft 74 is connected to the rotor (not shown) of a data transmitter 75 which is connected to the housing 70. The stub shaft 74 is disconnected from the rotatable shaft 71.

Rotatable drums 76 and 77 are mounted within the housing 70 coaxially with the shafts 71 and 74. The drums 76 and 77 are mounted so as to be separately rotatable about the shaft 71. A spring bias is applied to the drums 76 and 77 by means of springs 78 and 79, respectively. The bias applied by springs 78 and 79 is in the same direction, so that the rotation of drums 76 and 77 is also in the same direction. A cutout 80 is provided in the housing 70 for the purpose of running the wires, which are connected to the element to be measured, through the housing and about the drums 76 and 77.

A third rotatable drum 82, which may be just an arm if desired, is mounted upon the rotatable shaft 71 but is not connected to the shaft 71, so that the drum 82 does not rotate with the shaft 71. The hub portion 83 of drum 82 is clamped against stub shaft 74 by means of a bracket or collar grip 84.

Interconnecting the three rotatable drums is a rod member including a ball and socket fitting consisting of a ball 85 which is disposed in a recess provided in drum 77, and a pair of pins 86 disposed in recesses 87 provided in each of the drums 76 and 82. The pins are made flexible in one plane.

In operation, if the drums 76 and 77 are rotated due to a change in temperature in the varying temperature system, they are rotated unequal amounts because of the difference in the coefficients of the associated wires. As a result, the rod member will be pivoted about one end by an amount proportional to the difference in angular rotation of drums 76 and 77 due to expansion of the wires with temperature. The pivot point can be adjusted so that it coincides with the point where the pin 86 is coupled to the drum 82. In this manner, the rotation of the drum 82 results only from movement of the pivot end of the rod member, which movement is proportional to the change in dimensions of the element to be measured, and not to expansion of the wires.

Rotation of the drum 82 causes a proportional rotation of stub shaft 74 which is connected to the rotor member in the transmitter 75. Therefore, a signal is generated from the transmitter 75 which is proportional only to the change in dimensions or movement of the element to be measured. This signal may be transmitted to the remote indicator, or if a servo system is utilized, the signal may be transmitted to the controller of the servo system.

The pins 86 at either end of the rod member are made flexible because as the rod member is skewed with relation to the axis of rotation, a bending moment is applied between two ends and the center. This is evident when it is considered that as the rod member is skewed, the relative movement of pin ends is in an arc, the radius of which is the radius of the axis of the rod member from the axis of rotation of the drums.

An alternative construction of the rod member and couplings with the drums is shown in Fig. 6. The rod member, indicated at 100 in Fig. 6, has a ball-and-socket joint connection 101 with the drum 82. The joint includes a spherical portion 102 on the rod member 100 which is shown as a separate annular member but may be integrally formed if desired. The opposite end of rod member 100 is coupled to the intermediate drum 77 by a circular pin 106. The pin is movable radially in a hole 108 formed in the body of the drum 77. The rod member 100 passes through a transverse hole 110 in the pin 106. The hole 110 is elongated in the direction of the axis of the pin to permit some angular movement between the rod member 100 and the pin 106. By this construction it will be seen that relative rotation is permitted among the three drums in which the ratios of angular movement are fixed by the rod member, the ratios being equal to the ratios of the distances between the respective coupling points along the rod member.

I have therefore provided the art with a means for utilizing the difference in thermal coefficient of expansions of two materials to actuate a differential means to correct for the undesired expansion of the measuring means and have illustrated two specific embodiments of differential means. However, it is clear that various other differential means may be devised by one skilled in the art without departing from the scope of my invention.

I claim:

1. In combination with a system for maintaining a fixed separation between elements contained in an area subject to variations in temperature: a pair of members connected to at least one of the elements which are to be maintained in a fixed relationship, with one of said pair of members being made of a material having a different thermal coefficient of expansion from that of the other, a movable member for adjusting the position of one of said elements relative to the other, and means responsive to changes in the separation between said elements and changes in dimensions of the pair of members due to temperature variations to move said movable member an amount proportional to the changes in the separation between said elements.

2. In combination with a system for maintaining a fixed separation between elements contained in an area subject to variations in temperature: a pair of members connected to at least one of the elements which are to be maintained in a fixed relationship, with one of said pair of members being made of a material having a different thermal coefficient of expansion from that of the other; an indicator; and means responsive to changes in the separation between said elements and changes in dimensions of the pair of members due to temperature variations to cause said indicator to indicate the change in separation between said elements.

3. A device for sensing positional changes of an object under varying temperature conditions including: a pair of members, with one member having a different thermal coefficient of expansion from the thermal coefficient of expansion of the other member, said pair of members being adapted for connection to the object being sensed; a first movable means operated by one of said members and a second movable means operated by the other of said members, the movement of each of said movable means being proportional to the change in dimensions of the member operating the particular movable means due to temperature changes; and means responsive to the difference in the change in dimensions of one of said members when compared with the change in dimensions of the other of said members serving to compensate for the changes in dimensions of said members due to temperature changes.

4. A device in accordance with claim 3 wherein the means responsive to the difference in the change in dimensions of one of said members when compared with the other of said members includes a differential gear arrangement.

5. A device in accordance with claim 3 wherein the means responsive to the difference in the change in dimensions of one of said members when compared with the other of said members includes a flexible member connected to said first and second movable means.

6. A device for sensing the position of a remote object under varying temperature conditions including: a housing having journaled therein a first shaft and a second shaft with one end of each shaft protruding from said housing, a drum attached to the protruding portion of each shaft, a separate wire member wound about each of said drums, with one end of each wire member being adapted for connection to the remote object whose position is being sensed, the thermal coefficient of expansion of one wire being different from the thermal coefficient of expansion of the other wire, means for biasing each of said drums to maintain tension upon each of said wires thereby causing an amount of rotation of each drum proportional to the change in length due to temperature changes of the particular wire connected to the drum, means mounted in the housing for converting an angular shaft position to an electrical signal and including movable stator means and rotor means, said rotor means being connected to a third shaft journaled in said housing, means controlled by the first shaft for rotating said third shaft an amount determined by the rotation of said first shaft, and differential means controlled by the difference in rotation of said first shaft when compared to the rotation of said second shaft for moving said stator means, the differential means being adapted to move the stator means an amount sufficient to correct for a change in length of one of said wires in response to the difference in the changes in length of both of said wires due to a temperature change.

7. A device in accordance with claim 6 wherein the drums rotate in opposite directions and the wire having the larger thermal coefficient of expansion is wound about the drum on said first shaft, with the thermal coefficients of expansion remaining substantially constant over a wide temperature range.

8. A device for sensing the position of a remote object under varying temperature conditions including: a housing, a pair of separately rotatable drums mounted within said housing; a separate wire member wound upon each of said drums, with one end of each wire member being adapted for connection to the remote object, the thermal coefficient of expansion of one wire being different from the thermal coefficient of expansion of the other wire, means for biasing each of said drums to maintain tension upon each of said wire members thereby causing an amount of rotation of each drum proportional to the change in length due to temperature changes of the particular wire member wound about each drum, means mounted upon the housing for converting an angular shaft position to an electrical signal and including stator means and rotor means, said rotor means being operated by a shaft, a third rotatable drum connected to said shaft, and differential means interconnecting said three rotatable drums, said differential means being adapted to rotate said third drum in response to a differential rotation of said first and second drums and applying a correction for the changes in length of said wires due to changes in temperature.

9. A temperature compensated measuring device for sensing the distance between two elements comprising a pair of flexible members having different coefficients of expansion, the flexible members being secured at one of their ends to one of the elements, a pair of rotatable members supported by the other of the elements, the flexible members winding on and off the rotatable members as the two elements are moved relatively closer and further away, means responsive to the rotation of the rotatable members for sensing the rotation of the rotatable members with change in distance between the elements, and means responsive to the difference in the amount of rotation of the rotatable members due to unequal changes in length of the flexible members with changes in temperature for modifying the sensing means to compensate for the temperature effect on the rotation of the rotatable members.

10. A temperature compensated measuring device for sensing the distance between two elements comprising a pair of controlling members having different coefficients of expansion, the controlling members being secured at one of their ends to one of the elements, a pair of movable members supported by the other of the elements, the controlling members positioning the movable members as the two elements are moved relatively closer and further away, means responsive to the movement of the movable members for producing a signal indicative of the rotation of the rotatable members with change in distance between the elements, and means responsive to the difference in the amount of movement of the movable members produced by unequal changes in length with changes in temperature of the controlling members for modifying the signal producing means to compensate for the temperature effect on the rotation of the rotatable members.

11. A temperature compensated measuring device for sensing the distance between two elements comprising a pair of flexible members having different coefficients of expansion, the flexible members being secured at one of their ends to one of the elements, a pair of rotatable members supported by the other of the elements, the flexible members winding on and off the rotatable members as the two elements are moved relatively closer and further away, means responsive to the combined rotation of the rotatable members for producing a signal indicative of the rotation of the rotatable members with change in distance between the elements, means for sensing any difference in rotation of the rotatable members, and means responsive to the difference sensing means for controlling the signal producing means to correct for movement of the rotatable members due to changes in length of the flexible members with change in temperature.

12. A temperature compensated measuring device for sensing the distance between two elements comprising a pair of flexible members having different coefficients of expansion, the flexible members being secured at one of their ends to one of the elements, a pair of rotatable members supported by the other of the elements, the flexible members winding on and off the rotatable members as the two elements are moved relatively closer and further away, means responsive to the combined rotation of the rotatable members for producing a signal indicative of the rotation of the rotatable members with change in distance between the elements, means for sensing any difference in the amount of movement of the movable members, and means responsive to the difference sensing means for controlling the signal producing means to correct for movement of the movable members due to changes in length of the controlling members with change in temperature.

References Cited in the file of this patent

UNITED STATES PATENTS

| 2,241,086 | Gould | May 6, 1941 |
| 2,737,641 | Macgeorge | Mar. 6, 1956 |
| 2,772,833 | Chace | Dec. 4, 1956 |